(12) United States Patent
Schneider et al.

(10) Patent No.: US 8,315,924 B1
(45) Date of Patent: Nov. 20, 2012

(54) METHOD AND APPARATUS FOR AUTOMATING ACCOUNTING WITH CHECK VOUCHERS

(75) Inventors: James Alan Schneider, San Jose, CA (US); Rajalakshmi Ganesan, Los Altos Hills, CA (US); William T. Laaser, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 171 days.

(21) Appl. No.: 12/497,450

(22) Filed: Jul. 2, 2009

(51) Int. Cl.
*G07B 17/00* (2006.01)
(52) U.S. Cl. ............................ 705/30; 705/34
(58) Field of Classification Search ............ 705/30, 705/34
See application file for complete search history.

(56) References Cited

U.S. PATENT DOCUMENTS

| | | | | |
|---|---|---|---|---|
| 4,974,878 A * | 12/1990 | Josephson | ........... | 283/67 |
| 5,433,483 A * | 7/1995 | Yu | ........... | 283/58 |
| 5,740,271 A * | 4/1998 | Kunkler et al. | ........... | 382/137 |
| 5,750,972 A * | 5/1998 | Botvin | ........... | 235/379 |
| 5,899,981 A * | 5/1999 | Taylor et al. | ........... | 705/30 |
| 7,197,173 B2 * | 3/2007 | Jones et al. | ........... | 382/135 |
| 7,808,673 B2 * | 10/2010 | Fabel et al. | ........... | 358/1.18 |
| 7,882,000 B2 * | 2/2011 | Jones | ........... | 705/35 |
| 2001/0047331 A1 * | 11/2001 | Malanga et al. | ........... | 705/40 |
| 2003/0040988 A1 * | 2/2003 | Ha et al. | ........... | 705/30 |
| 2003/0046194 A1 * | 3/2003 | McClendon et al. | ........... | 705/30 |
| 2005/0065893 A1 * | 3/2005 | Josephson | ........... | 705/64 |
| 2006/0089907 A1 * | 4/2006 | Kohlmaier et al. | ........... | 705/40 |
| 2007/0112674 A1 * | 5/2007 | Jones | ........... | 705/45 |

* cited by examiner

*Primary Examiner* — Ramsey Refai
(74) *Attorney, Agent, or Firm* — Park, Vaughan, Fleming & Dowler LLP

(57) ABSTRACT

One embodiment of the present invention provides a system that facilitates automated accounting. During operation, the system receives a check voucher at a system, wherein the check voucher corresponds to a check. Next, the system performs an optical character recognition (OCR) operation on the check voucher to identify a set of tokens printed on the check voucher. The system then searches a dictionary of tokens for open invoices to identify a match between the set of tokens printed on the check voucher and tokens associated with an open invoice. Next, the system determines an amount of the check by determining the value of an amount token printed on the check voucher. Finally, the system applies a payment for the amount of the check to the open invoice.

21 Claims, 4 Drawing Sheets

METHOD AND APPARATUS FOR AUTOMATING ACCOUNTING WITH CHECK VOUCHERS

BACKGROUND

Related Art

Merchants typically receive checks from customers, or from bill pay services on behalf of customers, wherein the checks contain payments for open invoices. Typically, these merchants manually reconcile the invoice with payment information that is printed on a check voucher or on the check itself. However, this process is laborious and error-prone. Furthermore, many customers include one check to cover multiple open invoices, which further complicates the reconciliation process.

In order to speed up accounts receivable processing, many merchants include a payment coupon along with the bills that they send to their customers. These payment coupons typically have bar codes and other computer-readable identifiers to identify the particular invoices that are the subject of the payment. When the customer makes a payment, he or she typically fills out the payment coupon with information specifying how the merchant should apply each payment to each open invoice. The use of such payment coupons reduces the time required to reconcile payments, as well as reducing the potential for error.

While the use of payment coupons is beneficial, an increasing number of payments are received from bill pay services and from corporate accounting departments that do not have access to the original payment coupon.

SUMMARY

One embodiment of the present invention provides a system that facilitates automated accounting. During operation, the system receives a check voucher at a system, wherein the check voucher corresponds to a check. Next, the system performs an optical character recognition (OCR) operation on the check voucher to identify a set of tokens printed on the check voucher. The system then searches a dictionary of tokens for open invoices to identify a match between the set of tokens printed on the check voucher and tokens associated with an open invoice. Next, the system determines an amount of the check by determining the value of an amount token printed on the check voucher. Finally, the system applies a payment for the amount of the check to the open invoice.

In some embodiments of the present invention, the system identifies a line item on the check voucher, and the system applies the line item to the open invoice.

In some embodiments of the present invention, the line item includes a discount.

In some embodiments of the present invention, the system identifies a match between the set of tokens printed on the check voucher and tokens associated with the open invoice by comparing amounts of the open invoices to the amount of the check.

In some embodiments of the present invention, the system identifies a match between the set of tokens printed on the check voucher and tokens associated with the open invoice by comparing amounts of the open invoices to a sum of the amount of the check and the amounts of any discounts printed on the check voucher.

In some embodiments of the present invention, the system searches the dictionary of tokens for open invoices to identify a match between the set of tokens printed on the check voucher and tokens associated with a set of open invoices. Finally, the system applies a payment for the amount of the check to the set of open invoices.

In some embodiments of the present invention, if the system is unable to identify a match between the set of tokens printed on the check voucher and tokens associated with an open invoice, the system flags the check voucher for processing by a user.

In some embodiments of the present invention, the system determines a layout for the check voucher, wherein the layout indicates a position and a type of each token on the check voucher. Finally, the system saves the layout in a library to facilitate processing of subsequent check vouchers with the same layout.

In some embodiments of the present invention, the system determines an identifying token on the check voucher. Finally, the system uses the identifying token to retrieve the layout for the check voucher. Note that this can include a combination of identifying tokens.

DETAILED DESCRIPTION

Figure 1:
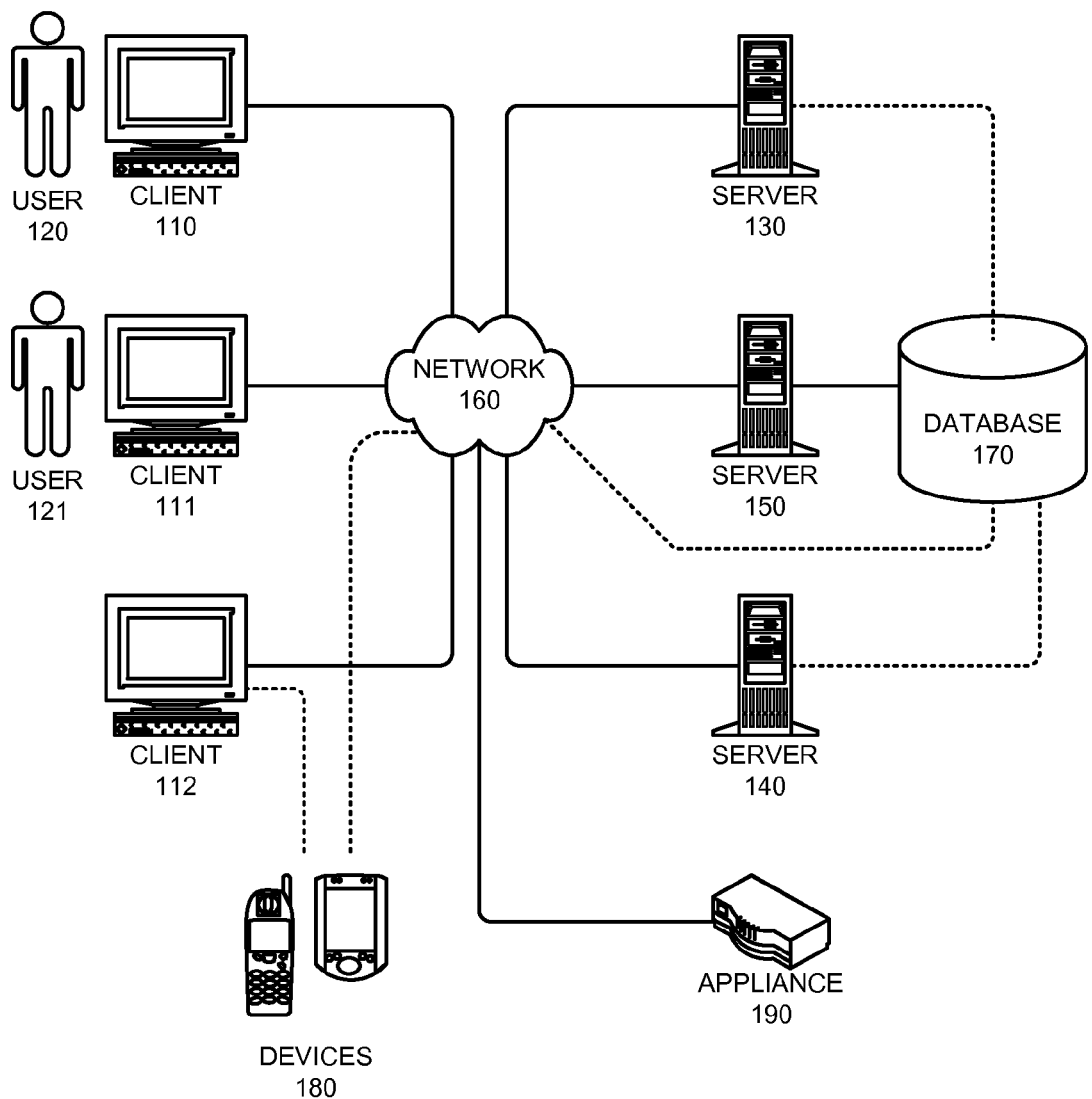
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system that facilitates automated accounting. During operation, the system receives a check voucher at a system, wherein the check voucher corresponds to a check. Next, the system performs an optical character recognition (OCR) process on the check voucher to identify a set of tokens printed on the check voucher. The system then searches a dictionary of tokens for open invoices to identify a match between the set of tokens printed on the check voucher and tokens associated with an open invoice. Next, the system determines an amount of the check by determining the value of an amount token printed on the check voucher. Finally, the system applies a payment for the amount of the check to the open invoice.

Note that the check voucher is created by a customer and is not the same as a payment coupon that is created by the merchant. In some embodiments, the system uses heuristics to determine the tokens.

In some embodiments of the present invention, the system identifies a line item on the check voucher. The system then applies the line item to the open invoice. In some instances, the check voucher may have only one line item, while in other instances the check voucher may have multiple line items. Furthermore, the system analyzes each line item separately to determine what it comprises, and to which invoice the line item is to be applied. Note that it is not uncommon to have multiple line items apply to one open invoice.

In some embodiments of the present invention, the line item includes a discount. Note that on some check vouchers, the discount will be listed on the same line as the billed amount and the net amount, while on other check vouchers, these amounts appear on different lines. The system analyzes the check voucher to determine the layout and logical structures of the check voucher.

Note that if the layout is a non-standard layout, the system may not know or have a way of knowing what that layout is. In these situations, the system could offer the ability for the human user (the merchant on the receiving end) to train the system. For example, the system enters a training mode where the voucher image is displayed to the user, and the user circles and tags tokens. Consider an unusual layout where the invoice amount appears on the line following the invoice identifier. In this situation, the user can circle and tag the invoice number as "invoice identifier", and then circle and tag the amount on the line below as the associated amount. The next time the system retrieves this type of voucher, the system identifies, retrieves, and applies the unusual layout.

In some embodiments of the present invention, the system identifies a match between the set of tokens printed on the check voucher and tokens associated with the open invoice by comparing amounts of the open invoices to the amount of the check.

In some embodiments of the present invention, the system identifies a match between the set of tokens printed on the check voucher and tokens associated with the open invoice by comparing amounts of the open invoices to a sum of the amount of the check and the amounts of any discounts printed on the check voucher.

The simplest way to match payments to invoices is to compare the totals for both. However, this might not work in instances where discounts are applied, where the customer does not pay the total due, or where errors are made on the customer's side. In these instances, a more detailed analysis may be performed that compares sub-elements (line items) as well as grouping techniques to determine if a payment matches a group of open invoices.

Furthermore, in some instances, other criteria might be used to try to locate a match. For example, the system might start with the oldest invoices first. In most cases, the oldest open invoices for a particular customer are the most likely invoices to be paid next.

In some embodiments of the present invention, the system searches the dictionary of tokens for open invoices to identify a match between the set of tokens printed on the check voucher and tokens associated with a set of open invoices. Note that this dictionary of tokens can come from multiple sources, including the accounting system, and can comprise information from sources other than open invoices, such as company contact information. Finally, the system applies a payment for the amount of the check to the set of open invoices.

As mentioned previously, sometimes a particular check is to be applied to a set of invoices. Often, these invoices were all created on the same date, or within a narrow window of time, such as one predetermined billing cycle.

In some embodiments of the present invention, if the system is unable to identify a match between the set of tokens printed on the check voucher and tokens associated with an open invoice, the system flags the check voucher for processing by a user. Note that this can involve notifying the user immediately, or adding the check voucher to a manual entry queue and proceeding with the next check voucher.

In some embodiments of the present invention, the system determines a layout for the check voucher, wherein the layout indicates a position and a type of each token on the check voucher. Finally, the system saves the layout in a library to facilitate processing of subsequent check vouchers with the same layout.

For example, once a layout has been determined for a particular voucher, such as one from "Acme Widgets," it is likely that subsequent payments from Acme Widgets will include check vouchers with the same layout. This layout is stored as a library template to facilitate in processing subsequent payments from Acme Widgets.

In some embodiments of the present invention, the system determines an identifying token on the check voucher. Finally, the system uses the identifying token to retrieve the layout for the check voucher. Note that this can include a combination of identifying tokens.

As mentioned in the previous example with Acme Widgets, it is likely that the system will encounter multiple check vouchers with the same format (either from the same company, or from different companies using the same accounting systems). When processing a check voucher, the system can look for identifying tokens on the check voucher to help the system determine the layout of the check voucher. These identifying tokens can be form numbers printed on the check voucher, as well as the maker of the check (the company name).

Additionally, there may be some additional interaction with the accounting system such that the interesting tokens for cross-reference are noted in the layout database. For example, if the system processes a voucher from Acme Widgets, there could be a number of tokens on the voucher, such as name and address of Acme Widgets to facilitate retrieving the layout for the check voucher.

Once the association between customer and voucher has been made in the accounting system, there can be feedback to the identification system regarding tokens of interest (e.g. tag the layout with "Acme Widgets" because the "Acme Widgets" token is the token likely to identify the customer, whereas some address token, like "Elm" or "street" is not).

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112, or a network, such as network 160. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100.

System

Figure 2:
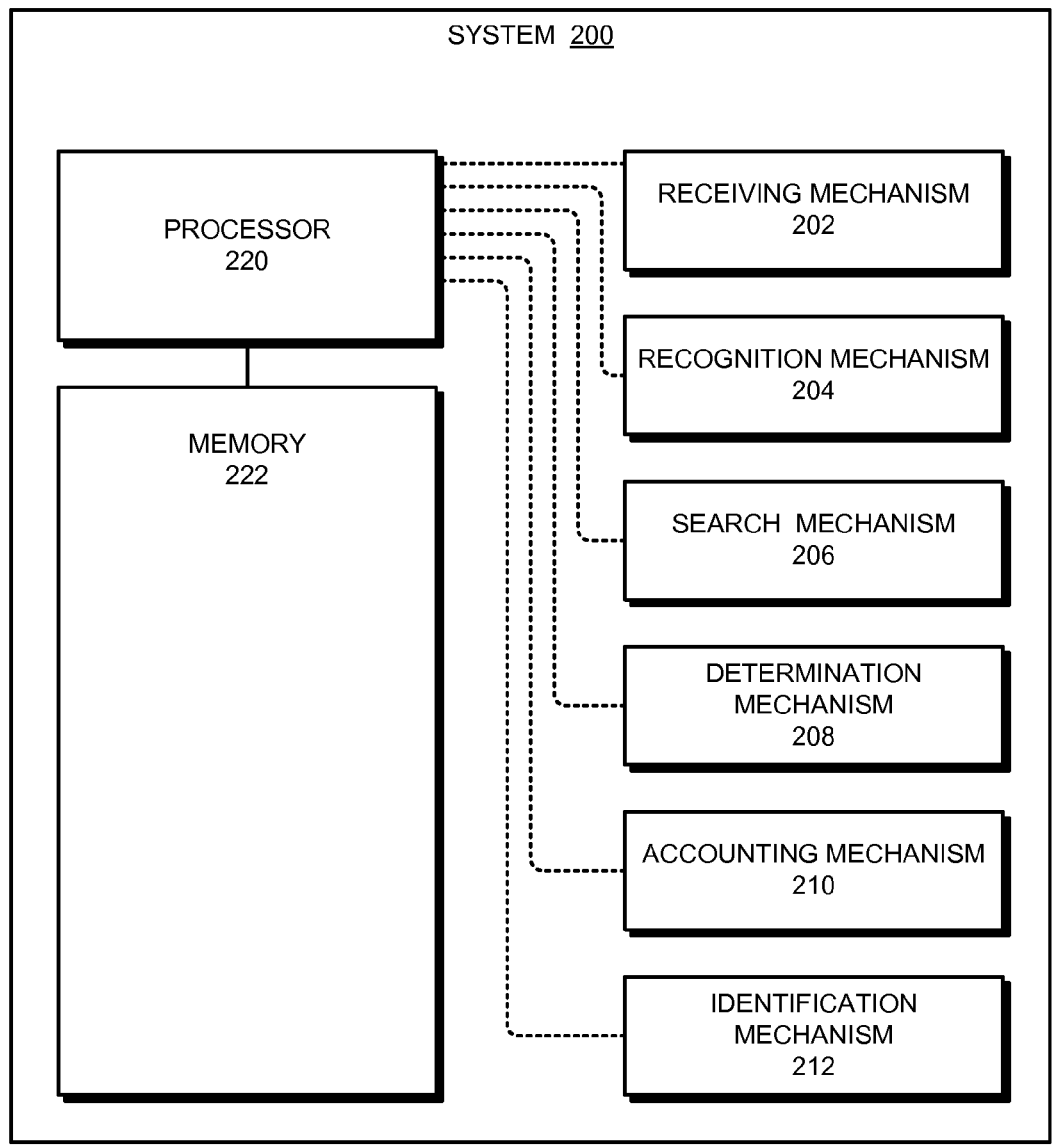
FIG. 2 illustrates a system in accordance with an embodiment of the present invention.

FIG. 2 illustrates a system 200 in accordance with an embodiment of the present invention. As illustrated in FIG. 2, system 200 can comprise server 150, database 170, appliance 190, client 110, devices 180, or any combination thereof. System 200 can also include receiving mechanism 202, recognition mechanism 204, search mechanism 206, determination mechanism 208, accounting mechanism 210, identification mechanism 212, processor 220, and memory 222.

For example, system 200 can comprise an accounting system executing on server 150. Furthermore, system 200 can store its financial records in database 170, as well as receive input from user 120 via client 110 and a scanner, such as appliance 190.

Check Voucher

Figure 3:
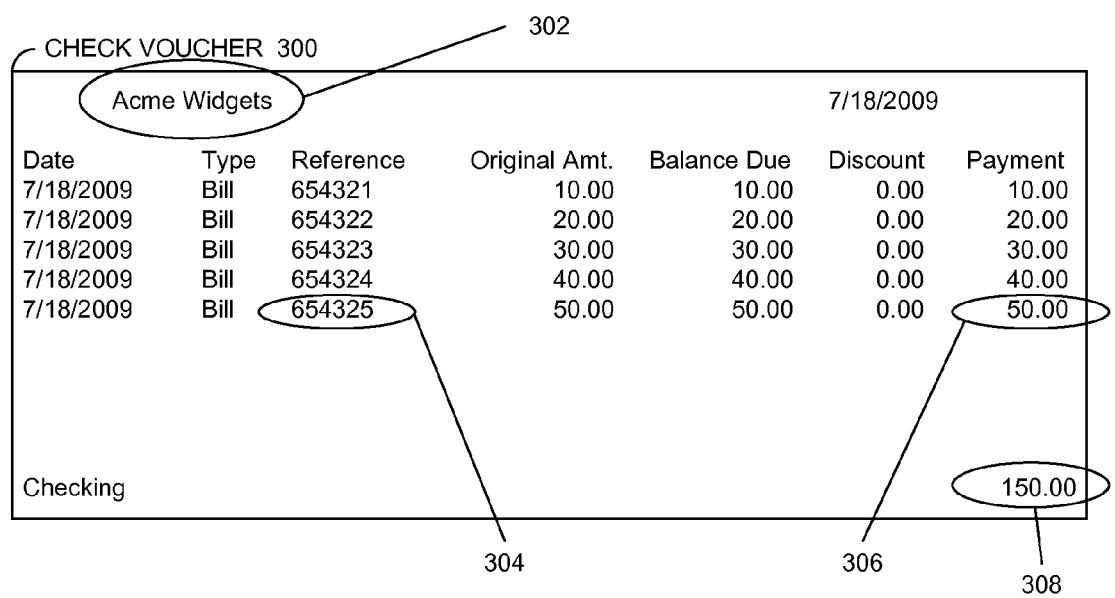
FIG. 3 illustrates a check voucher in accordance with an embodiment of the present invention.

FIG. 3 illustrates a check voucher 300 in accordance with an embodiment of the present invention. Check voucher 300 comprises a number of tokens, such as tokens 302-308. As mentioned previously, a token can be any logical grouping of characters printed on check voucher 300. For example, token 302 indicates the name of the company (Acme Widgets) making the payment associated with check voucher 300, and token 308 represents the total payment amount ($150.00).

Note that while tokens 302 and 308 apply to the entire payment, tokens 304 and 306 apply to a specific line item. In this example, token 304 identifies a reference number and token 306 identifies the amount applied to that particular reference number. In some embodiments of the present invention, the reference number identified by token 304 represents a merchant invoice number, while in other embodiments of the present invention, the reference number identified by token 304 represents an internal tracking number for the customer making the payment, Acme Widgets. In some embodiments of the present invention, the merchant may have an index or a list that cross references the merchant's invoice numbers with the customer's reference numbers.

Only a few of the tokens present on check voucher 300 have been identified for illustrative purposes. However, each date, value, type, amount, reference, etc. is a valid token for system 200 to process.

Automatically Reconciling Open Invoices

Figure 4:
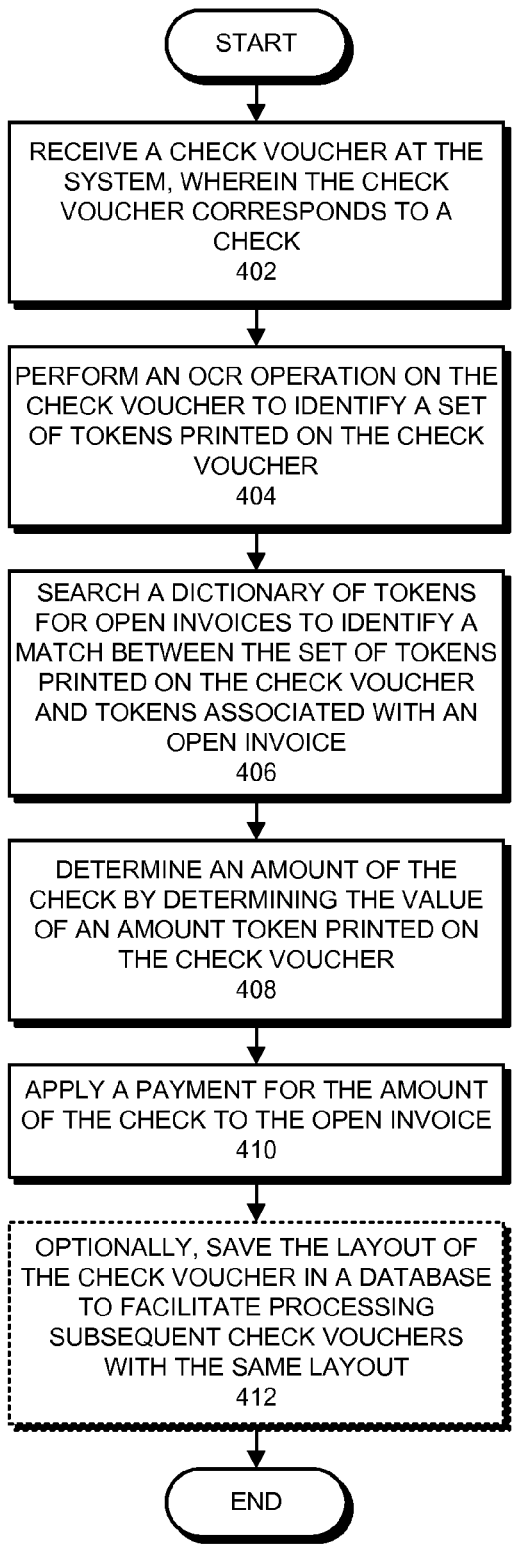
FIG. 4 presents a flow chart illustrating the process of automatically reconciling open invoices in accordance with an embodiment of the present invention.

FIG. 4 presents a flow chart illustrating the process of automatically reconciling open invoices in accordance with an embodiment of the present invention.

During operation, receiving mechanism 202 receives check voucher 300 at system 200 (operation 402), wherein check voucher 300 corresponds to a check. Next, recognition mechanism 204 performs an optical character recognition (OCR) process on check voucher 300 to identify a set of tokens printed on check voucher 300 (operation 404). Note that any type of existing OCR process may be used.

Next, search mechanism 206 searches a dictionary of tokens for open invoices to identify a match between the set of tokens printed on check voucher 300 and tokens associated with an open invoice (operation 406). Determination mechanism 208 then determines an amount of the check by determining the value of an amount token printed on check voucher 300 (operation 408). Finally, accounting mechanism 210 applies a payment for the amount of the check to the open invoice (operation 410).

Optionally, system 200 saves a layout for check voucher 300 in database 170 to facilitate processing subsequent check vouchers with the same layout (operation 412). In some embodiments of the present invention, layouts are saved to, and retrieved from, database 170 with identifying tokens, such as check maker name and/or form numbers printed on the check voucher.

Check Vouchers with Multiple Line Items

Figure 5:
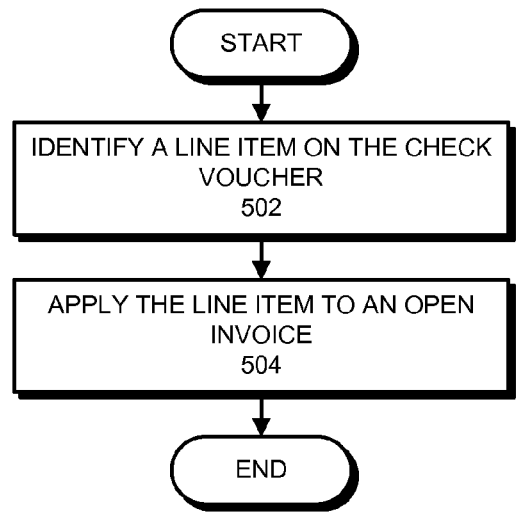
FIG. 5 presents a flow chart illustrating the process of automatically processing check vouchers with multiple line items in accordance with an embodiment of the present invention.

FIG. 5 presents a flow chart illustrating the process of automatically processing check vouchers with multiple line items in accordance with an embodiment of the present invention.

During operation, identification mechanism 212 identifies a line item on check voucher 300 (operation 502). Finally, accounting mechanism 210 is further configured to apply the line item to an open invoice (operation 504). Note that a line item might include payment information, discount information, comments, or any combination of the three.

Also note that multiple line items can be applied to one open invoice, and one line item can be applied to multiple invoices. That is to say, a one-to-one ratio of line items to invoices may or may not exist. Furthermore, the relationship could be one-to-many or many-to-one, or even a mix of the three on the same check voucher.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for automating accounting, the method comprising:
   receiving a check voucher at a system, wherein the check voucher corresponds to a check, wherein the check voucher is neither a check nor an invoice;
   performing an optical character recognition (OCR) operation on the check voucher to identify a set of tokens printed on the check voucher;
   searching a dictionary of tokens for open invoices to identify a match between the set of tokens printed on the check voucher and tokens associated with an open invoice;
   determining an amount of the check by determining the value of an amount token printed on the check voucher;
   applying a payment for the amount of the check to the open invoice;
   determining a layout for the check voucher, wherein the layout indicates a position and a type of each token on the check voucher;
   saving the layout in a library to facilitate processing of subsequent check vouchers with the same layout;
   determining an identifying token on the check voucher; and
   using the identifying token to retrieve the layout for the check voucher.

2. The method of claim 1, further comprising:
   identifying a line item on the check voucher; and
   applying the line item to the open invoice.

3. The method of claim 2, wherein the line item includes a discount.

4. The method of claim 1, wherein identifying a match between the set of tokens printed on the check voucher and tokens associated with the open invoice involves comparing amounts of the open invoices to the amount of the check.

5. The method of claim 1, wherein identifying a match between the set of tokens printed on the check voucher and tokens associated with the open invoice involves comparing amounts of the open invoices to a sum of the amount of the check and the amounts of any discounts printed on the check voucher.

6. The method of claim 1, further comprising:
   searching the dictionary of tokens for open invoices to identify a match between the set of tokens printed on the check voucher and tokens associated with a set of open invoices; and
   applying a payment for the amount of the check to the set of open invoices.

7. The method of claim 1, wherein if the system is unable to identify a match between the set of tokens printed on the check voucher and tokens associated with an open invoice, the method further comprises flagging the check voucher for processing by a user.

8. A computer-readable storage medium storing instructions that when executed by a computer cause the computer to perform a method for automating accounting, the method comprising:
   receiving a check voucher at a system, wherein the check voucher corresponds to a check, wherein the check voucher is neither a check nor an invoice;
   performing an optical character recognition (OCR) operation on the check voucher to identify a set of tokens printed on the check voucher;
   searching a dictionary of tokens for open invoices to identify a match between the set of tokens printed on the check voucher and tokens associated with an open invoice;
   determining an amount of the check by determining the value of an amount token printed on the check voucher;
   applying a payment for the amount of the check to the open invoice;
   determining a layout for the check voucher, wherein the layout indicates a position and a type of each token on the check voucher;
   saving the layout in a library to facilitate processing of subsequent check vouchers with the same layout;
   determining an identifying token on the check voucher; and
   using the identifying token to retrieve the layout for the check voucher.

9. The computer-readable storage medium of claim 8, wherein the method further comprises:
   identifying a line item on the check voucher; and
   applying the line item to the open invoice.

10. The computer-readable storage medium of claim 9, wherein the line item includes a discount.

11. The computer-readable storage medium of claim 8, wherein identifying a match between the set of tokens printed on the check voucher and tokens associated with the open invoice involves comparing amounts of the open invoices to the amount of the check.

12. The computer-readable storage medium of claim 8, wherein identifying a match between the set of tokens printed on the check voucher and tokens associated with the open invoice involves comparing amounts of the open invoices to a sum of the amount of the check and the amounts of any discounts printed on the check voucher.

13. The computer-readable storage medium of claim 8, wherein the method further comprises:

searching the dictionary of tokens for open invoices to identify a match between the set of tokens printed on the check voucher and tokens associated with a set of open invoices; and applying a payment for the amount of the check to the set of open invoices.

14. The computer-readable storage medium of claim 8, wherein if the system is unable to identify a match between the set of tokens printed on the check voucher and tokens associated with an open invoice, the method further comprises flagging the check voucher for processing by a user.

15. An apparatus configured for automating accounting, comprising:
- a processor;
- a memory;
- a receiving mechanism configured to receive a check voucher at a system, wherein the check voucher corresponds to a check, wherein the check voucher is neither a check nor an invoice;
- a recognition mechanism configured to perform an optical character recognition (OCR) operation on the check voucher to identify a set of tokens printed on the check voucher;
- a search mechanism configured to search a dictionary of tokens for open invoices to identify a match between the set of tokens printed on the check voucher and tokens associated with an open invoice;
- a determination mechanism configured to determine an amount of the check by determining the value of an amount token printed on the check voucher;
- an accounting mechanism configured to apply a payment for the amount of the check to the open invoice;
- wherein the apparatus further determines a layout for the check voucher, wherein the layout indicates a position and a type of each token on the check voucher; saves the layout in a library to facilitate processing of subsequent check vouchers with the same layout; determines an identifying token on the check voucher; and uses the identifying token to retrieve the layout for the check voucher.

16. The apparatus of claim 15, further comprising:
an identification mechanism configured to identify a line item on the check voucher; and
wherein the accounting mechanism is further configured to apply the line item to the open invoice.

17. The apparatus of claim 16, wherein the line item includes a discount.

18. The apparatus of claim 15, wherein the search mechanism is further configured to identify a match between the set of tokens printed on the check voucher and tokens associated with the open invoice by comparing amounts of the open invoices to the amount of the check.

19. The apparatus of claim 15, wherein the search mechanism is further configured to identify a match between the set of tokens printed on the check voucher and tokens associated with the open invoice by comparing amounts of the open invoices to a sum of the amount of the check and the amounts of any discounts printed on the check voucher.

20. The apparatus of claim 15:
wherein the search mechanism is further configured to search the dictionary of tokens for open invoices to identify a match between the set of tokens printed on the check voucher and tokens associated with a set of open invoices; and
wherein the accounting mechanism is further configured to apply a payment for the amount of the check to the set of open invoices.

21. The apparatus of claim 15, wherein the accounting mechanism is further configured to flag the check voucher for processing by a user if the system is unable to identify a match between the set of tokens printed on the check voucher and tokens associated with an open invoice.

* * * * *